No. 607,420. Patented July 19, 1898.
H. F. BROWN.
ORE ROASTING FURNACE.
(Application filed Aug. 6, 1897.)
(No Model.) 13 Sheets—Sheet 3.
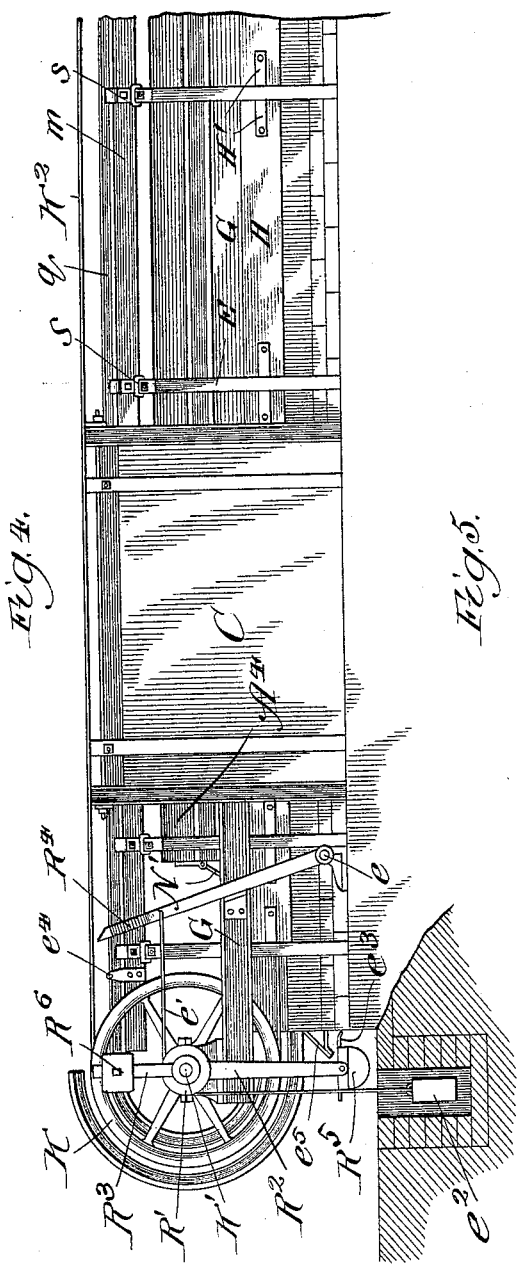
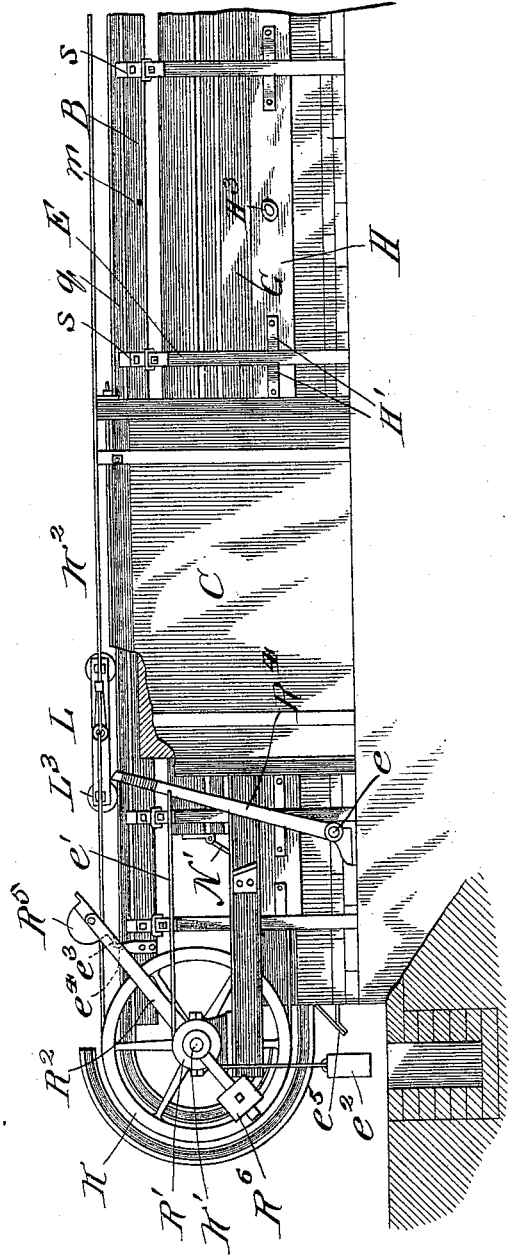
Witnesses:
Inventor:
Horace F. Brown,
By Dyrenforth & Dyrenforth,
Att'ys.

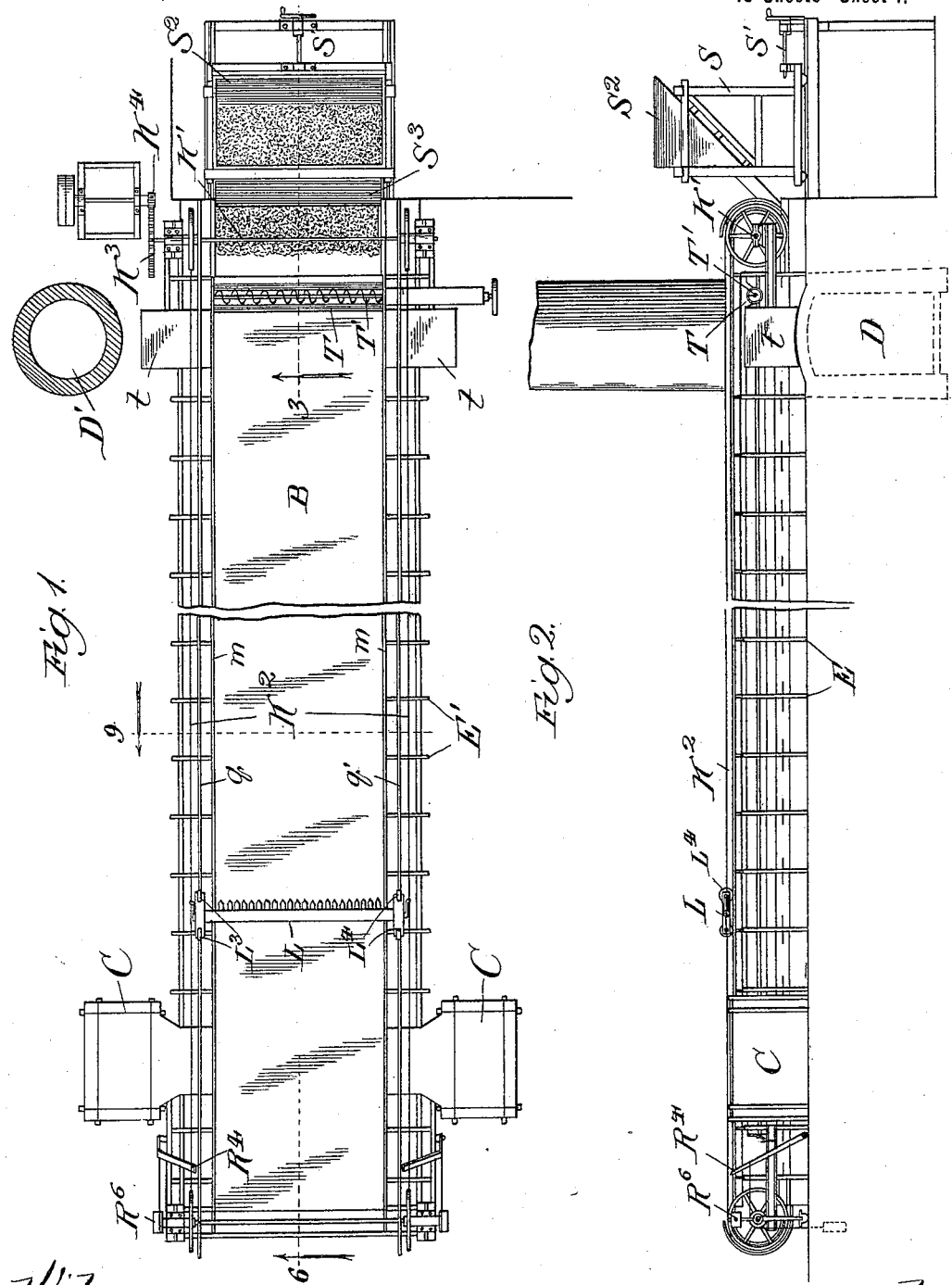

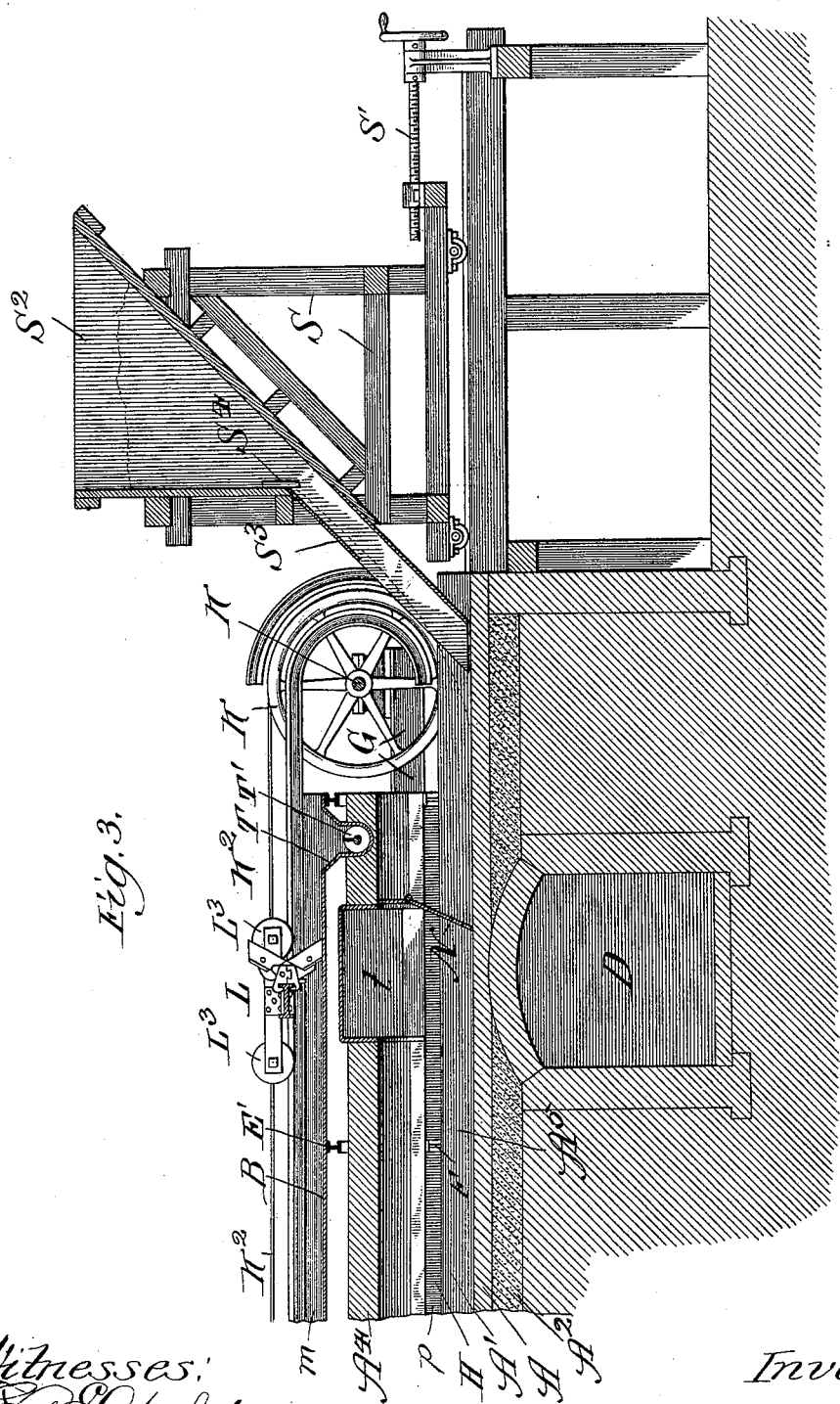

No. 607,420. Patented July 19, 1898.
H. F. BROWN.
ORE ROASTING FURNACE.
(Application filed Aug. 6, 1897.)
(No Model.) 13 Sheets—Sheet 4.
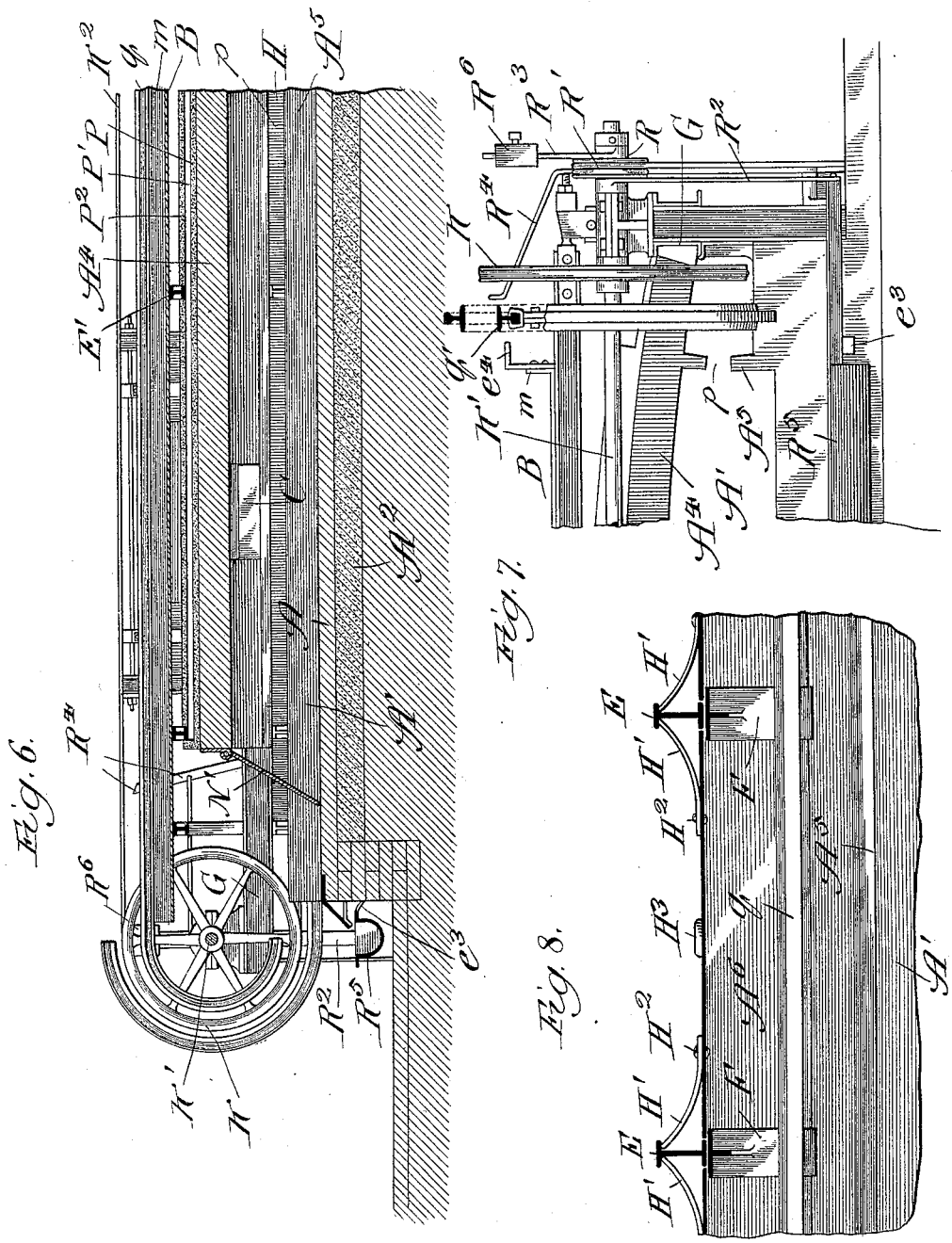
Witnesses.
Inventor:
Horace F. Brown,
By Dyrenforth & Dyrenforth,
Attys.

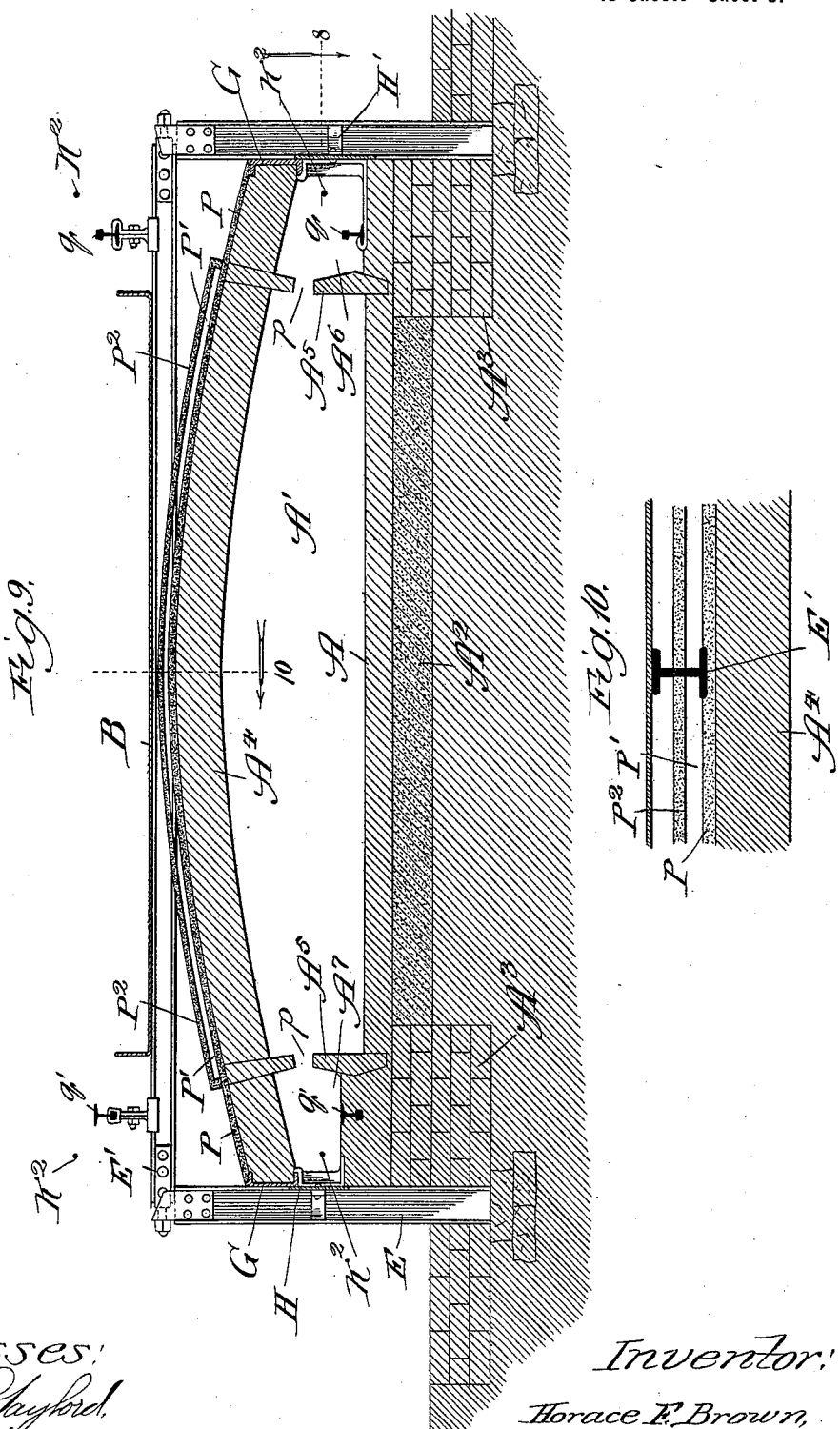

No. 607,420. Patented July 19, 1898.
H. F. BROWN.
ORE ROASTING FURNACE.
(Application filed Aug. 6, 1897.)
(No Model.) 13 Sheets—Sheet 6.
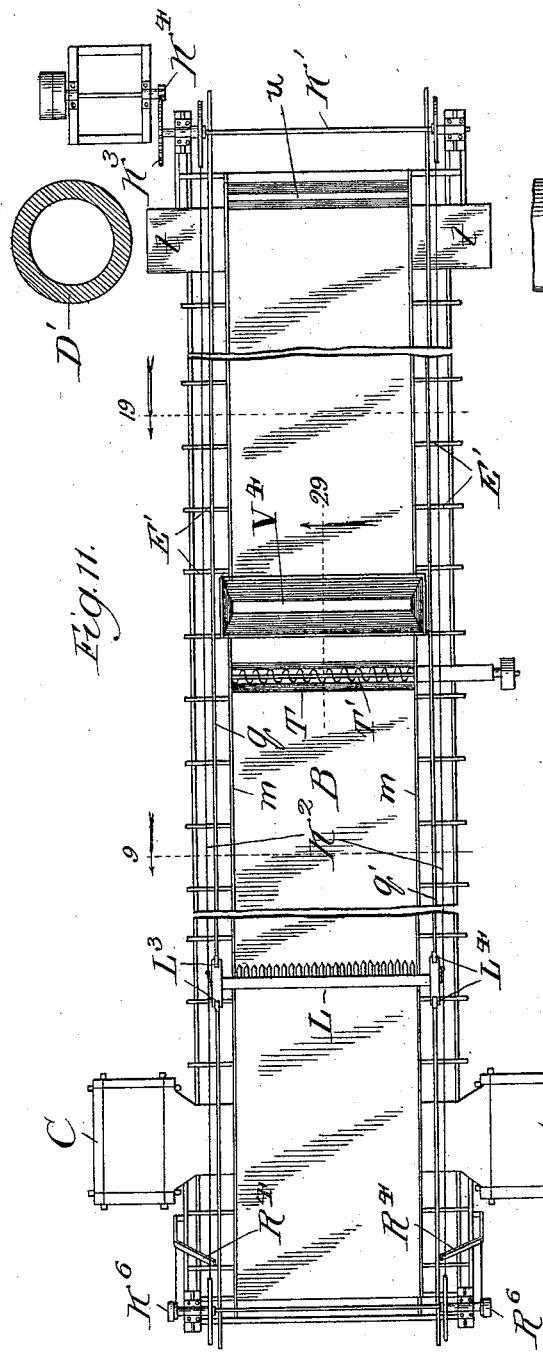
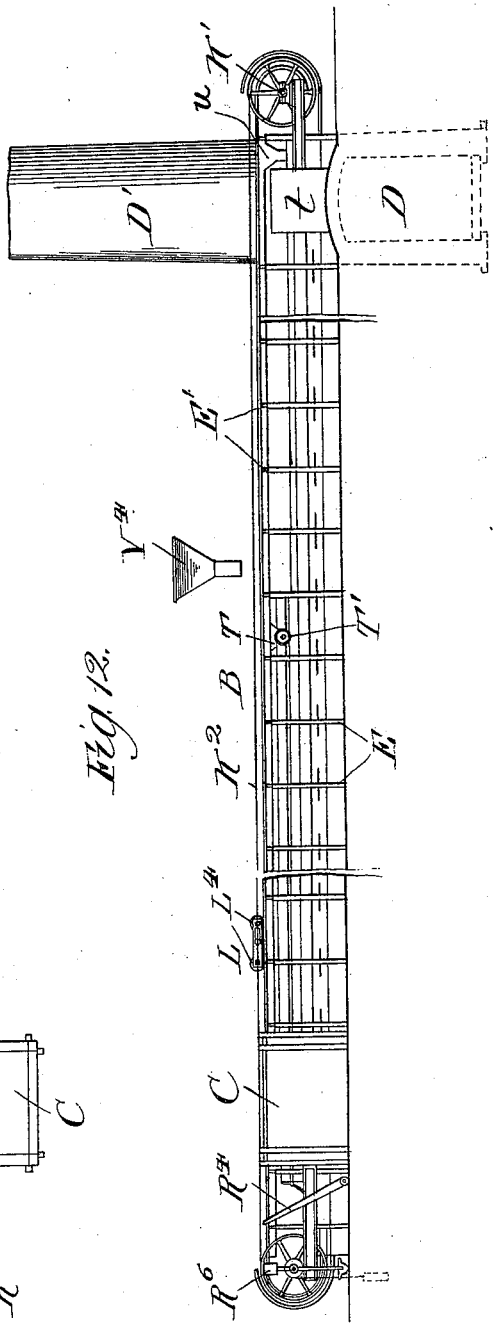
Witnesses:
Inventor:
Horace F. Brown,
By Dyrenforth & Dyrenforth,
Attys.

No. 607,420. Patented July 19, 1898.
H. F. BROWN.
ORE ROASTING FURNACE.
(Application filed Aug. 6, 1897.)
(No Model.) 13 Sheets—Sheet 7.
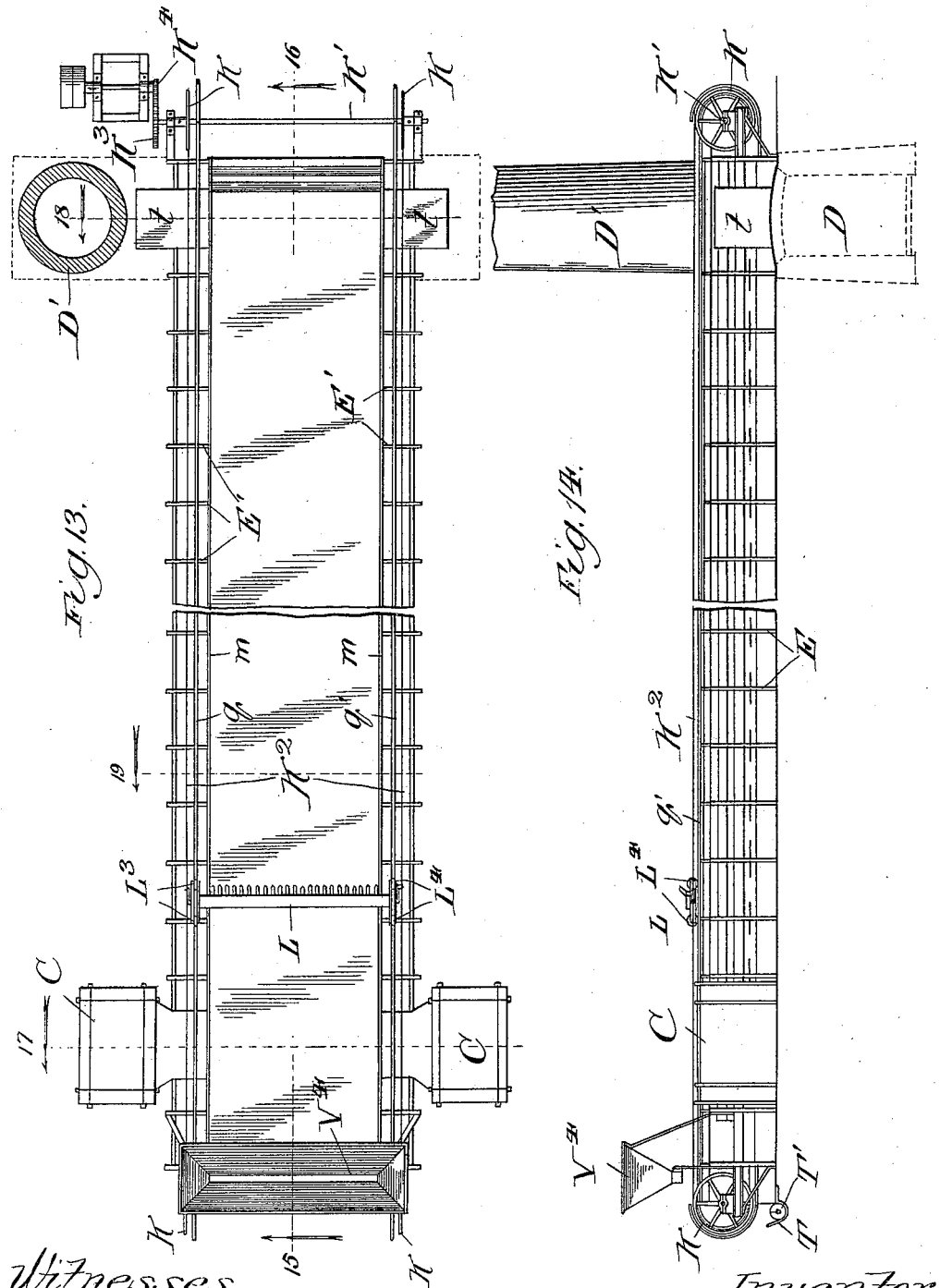
Witnesses
Inventor:
Horace F. Brown,
By Dyrenforth & Dyrenforth,
Attys.

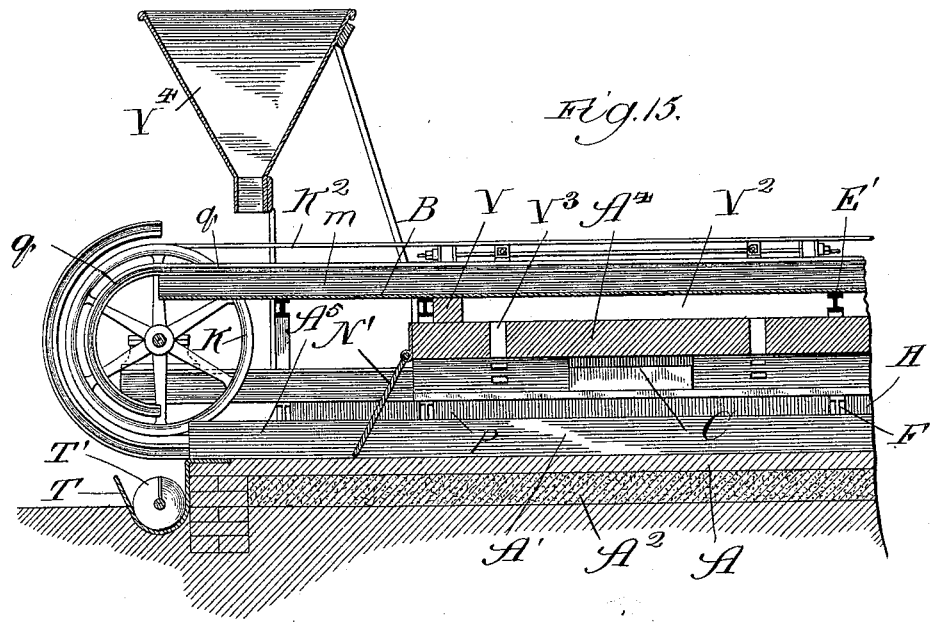
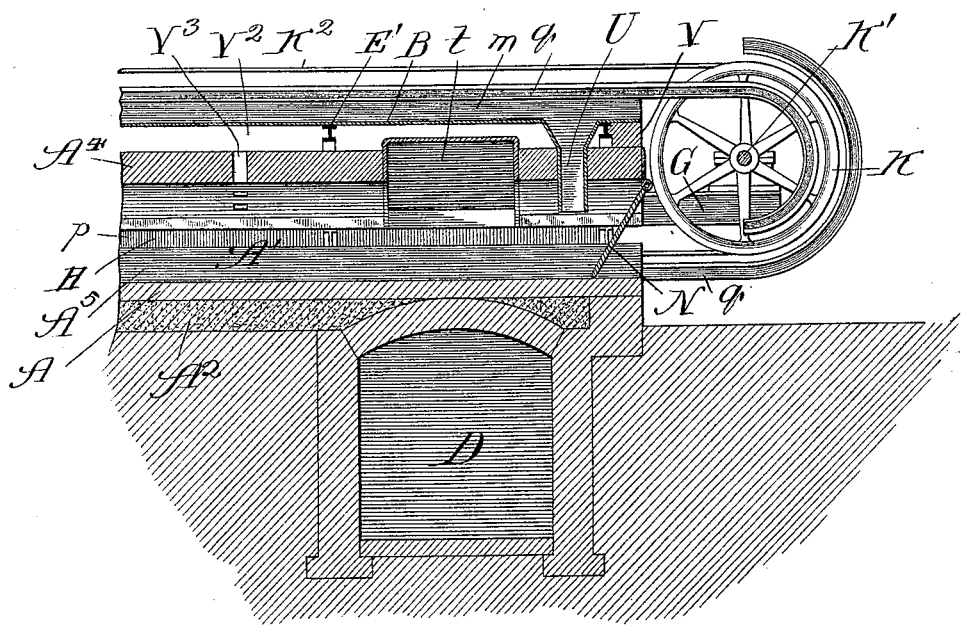

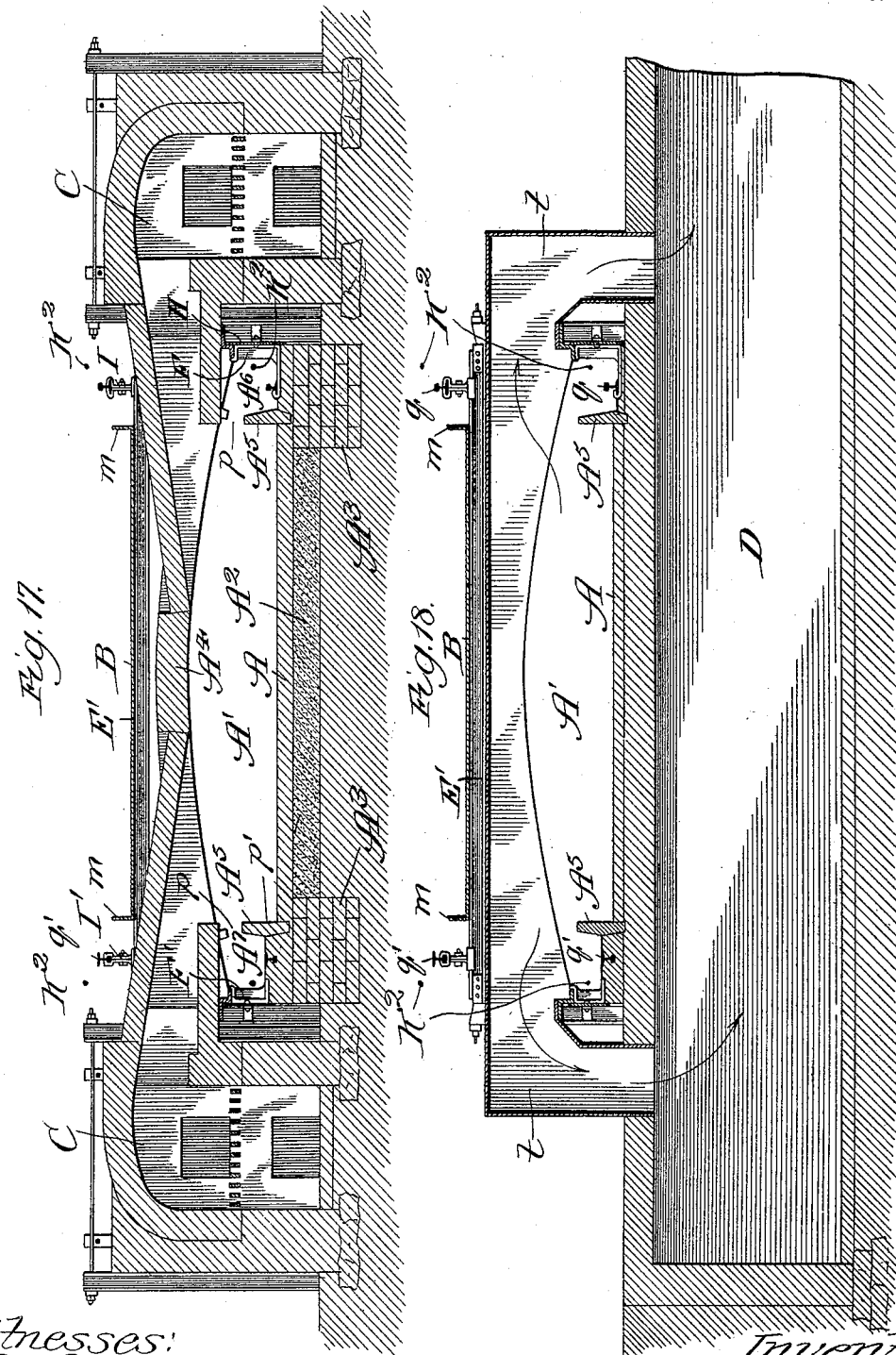

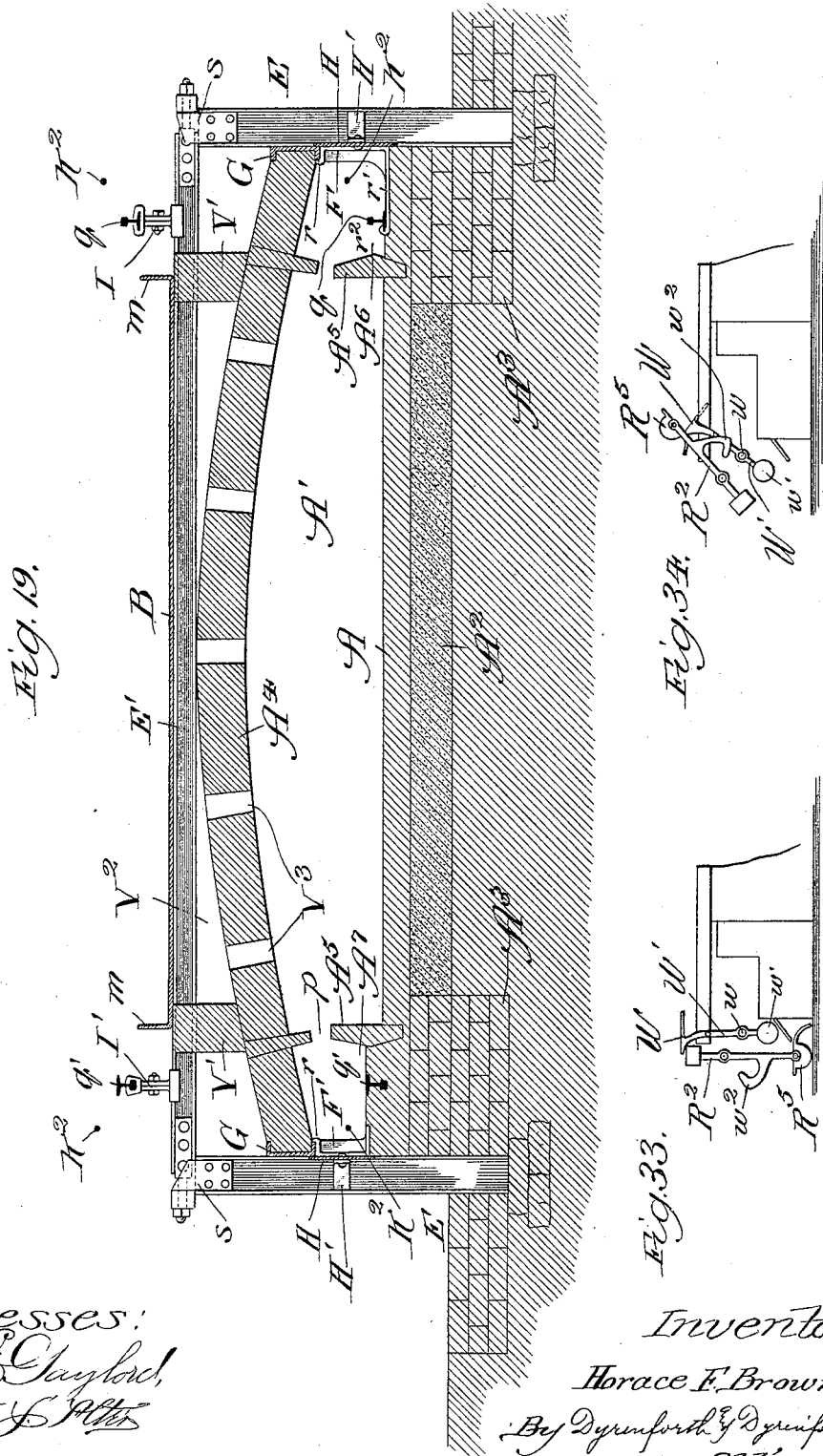

No. 607,420. Patented July 19, 1898.
H. F. BROWN.
ORE ROASTING FURNACE.
(Application filed Aug. 6, 1897.)
(No Model.) 13 Sheets—Sheet 11.
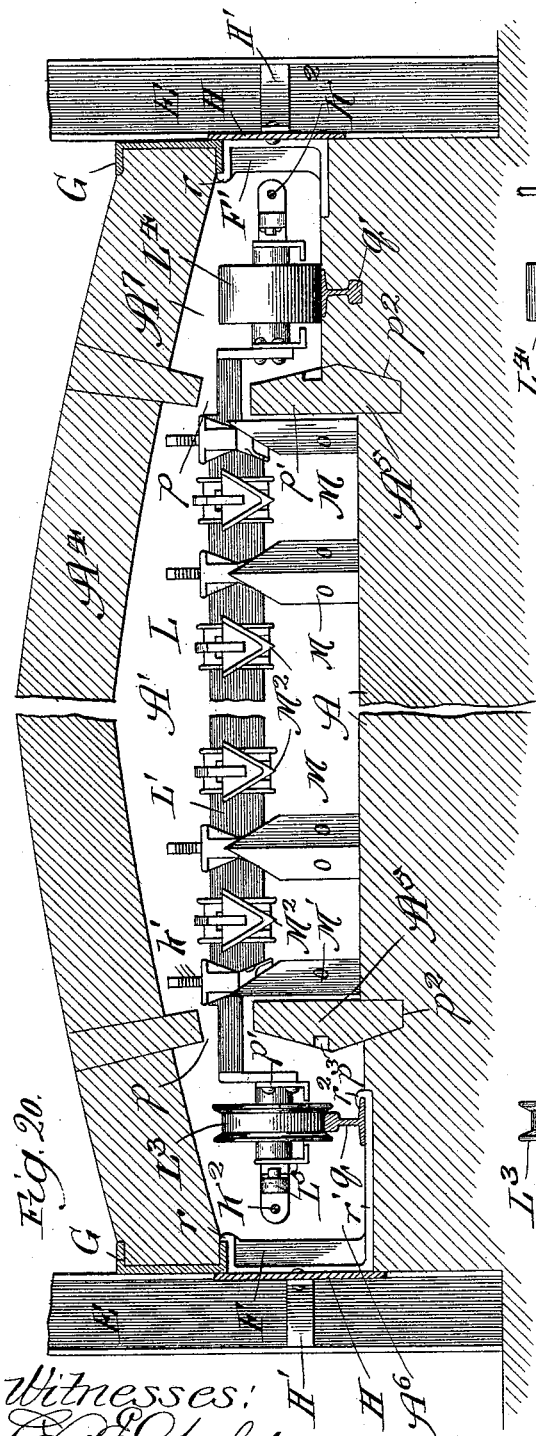
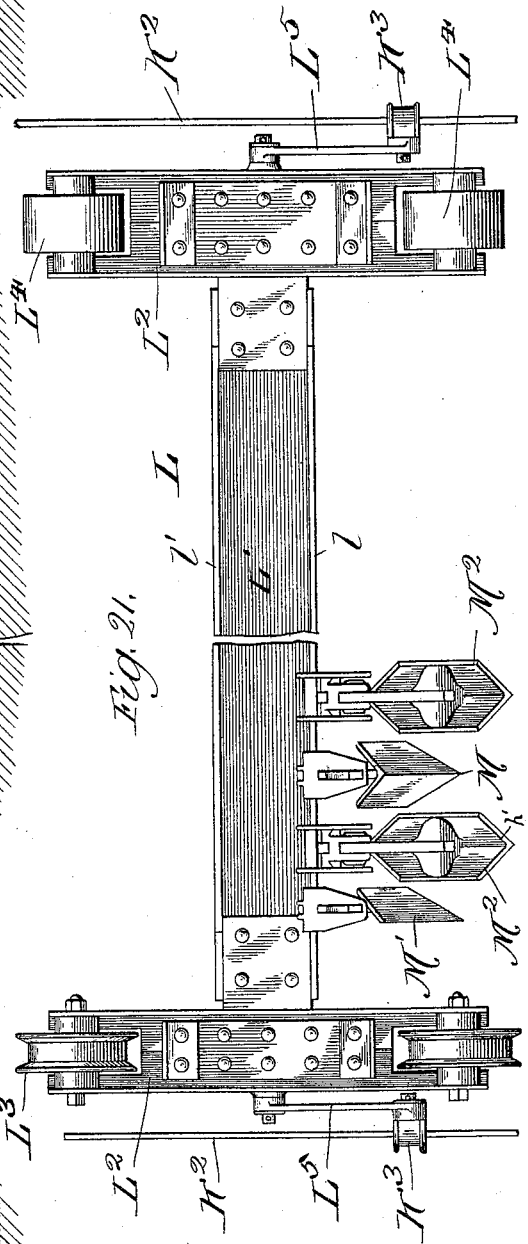
Witnesses:
Inventor:
Horace F. Brown,
By Dyrenforth & Dyrenforth,
Attys.

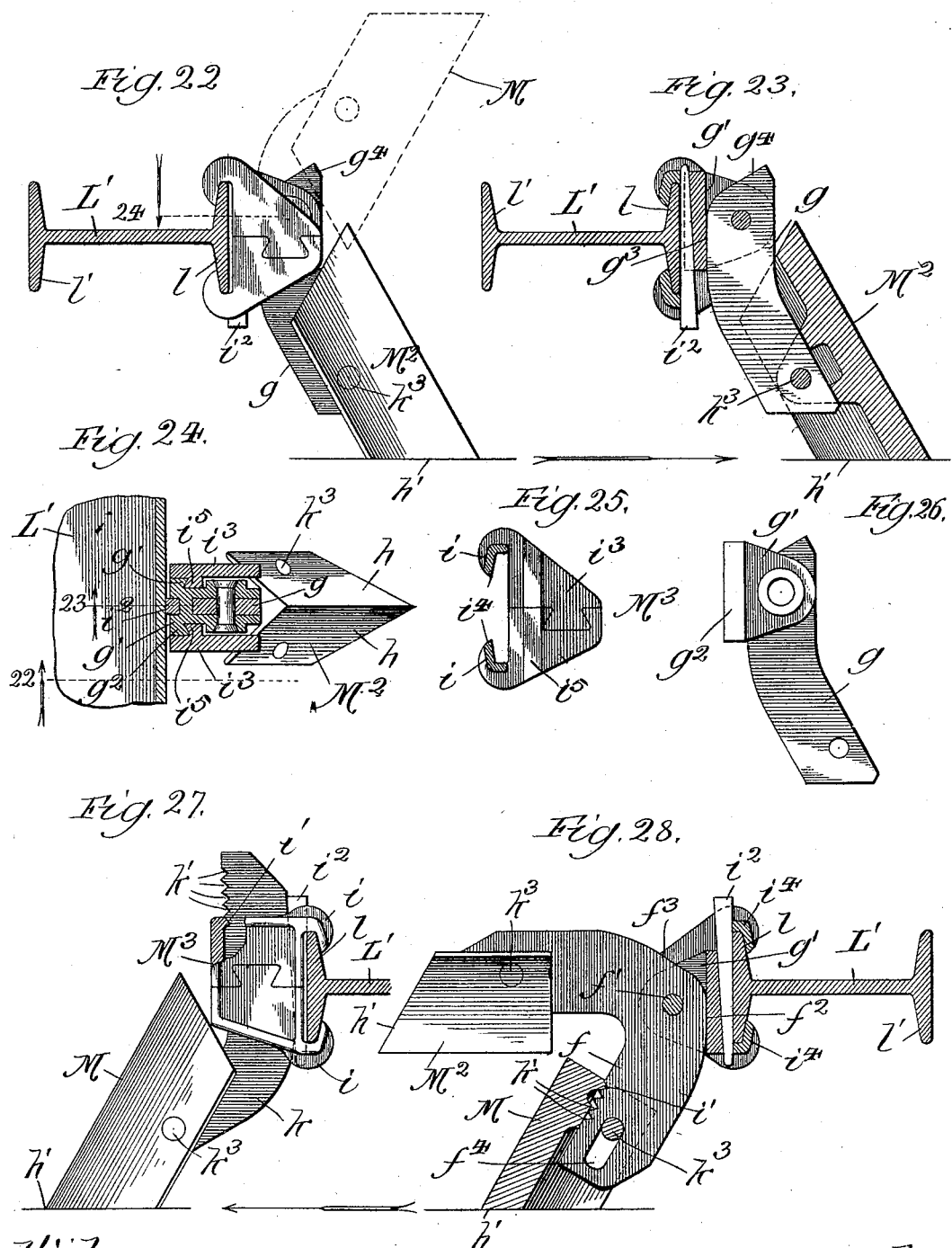

No. 607,420. Patented July 19, 1898.
H. F. BROWN.
ORE ROASTING FURNACE.
(Application filed Aug. 6, 1897.)
(No Model.) 13 Sheets—Sheet 13.
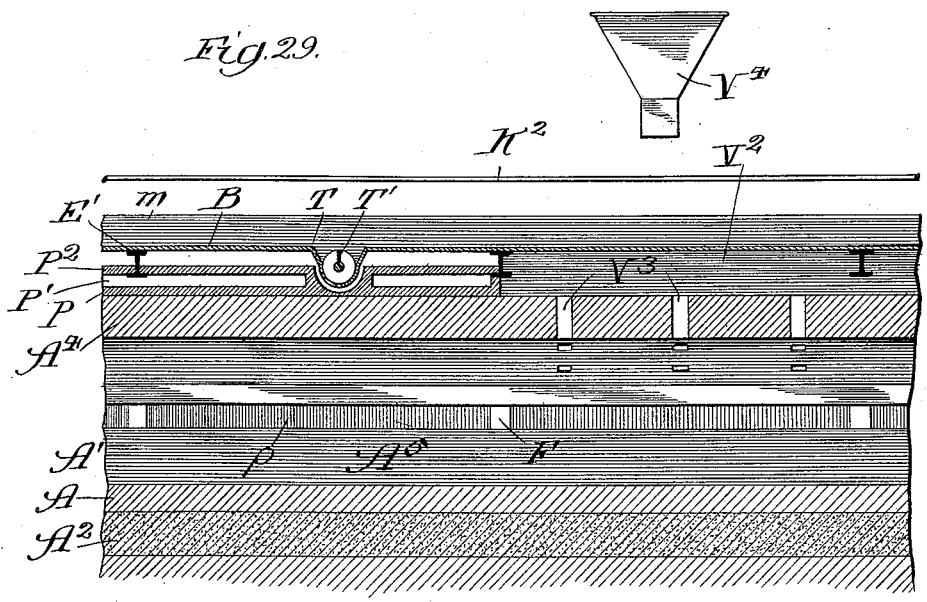
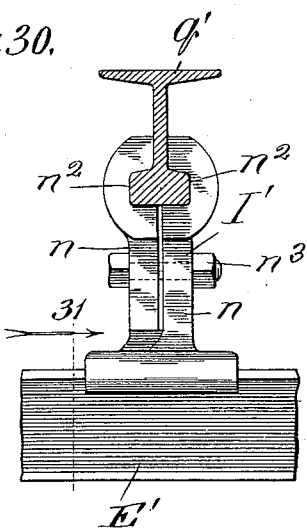
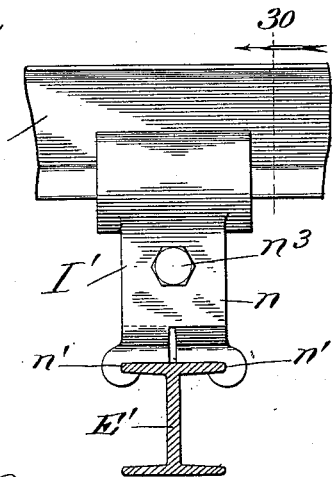
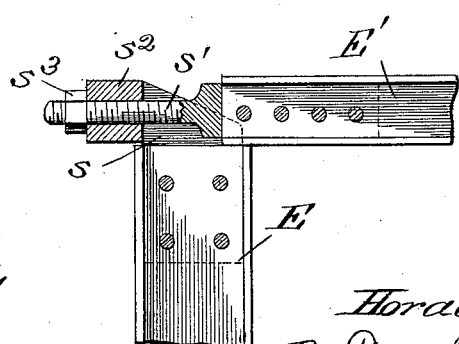
Witnesses:
Inventor:
Horace F. Brown,
By Dyrenforth & Dyrenforth,
Attys.

UNITED STATES PATENT OFFICE.

HORACE F. BROWN, OF CHICAGO, ILLINOIS.

ORE-ROASTING FURNACE.

SPECIFICATION forming part of Letters Patent No. 607,420, dated July 19, 1898.

Application filed August 6, 1897. Serial No. 647,278. (No model.)

*To all whom it may concern:*

Be it known that I, HORACE F. BROWN, a citizen of the United States, residing at Chicago, in the county of Cook and State of Illinois, have invented new and useful Improvements in Ore-Roasting Furnaces, of which the following is a specification.

My invention relates to improvements in ore-roasting furnaces of the class in which the ore is plowed and advanced along a roasting-hearth by means of mechanical stirring devices.

The objects of my improvements are, first, to provide a generally-improved furnace structure which shall be particularly simple, durable, economical in the use of fuel, and capable of adjustment as desired to maintain all the fixed parts in proper rigid relation under the expansive and contractive influences of changes of temperature; second, to provide a furnace involving floors located one above the other in which the lower floor constitutes the ore-roasting hearth and in which the upper floor, in whole or in part, is employed for cooling the ore; third, to provide traveling mechanical stirring devices arranged to travel across the lower and upper floors of a furnace, but so constructed that the roof or arch of the lower hearth may be particularly low to avoid the necessity of employing a roasting-chamber of greater area in cross-section than is necessary for the greatest economy in the use of fuel; fourth, to provide means for elevating ore from the lower hearth to the upper floor; fifth, to provide improved means for feeding ore directly to the lower hearth; sixth, to provide an improved construction involving a lower roasting-hearth and an upper drying-floor; seventh, to provide an improved construction involving a lower roasting-hearth and an upper cooling and drying floor; eighth, to provide an improved construction of mechanical stirrers or rabbles for use in ore-roasting furnaces, and, finally, to provide certain improvements in the general as well as in details of construction of various parts of an ore-roasting furnace, to the end of rendering the furnace particularly desirable and economical in use.

In a large measure the improvements forming the subject-matter of this application may be applied to any furnace employing traveling stirring devices. Other features relate more particularly to a furnace employing a lower roasting-hearth and an upper hearth which is to be used in whole or in part for cooling the ore after it has been roasted, and still other features relate more particularly to a furnace employing a lower roasting-hearth and an upper hearth which is to be used for drying ore previous to roasting it.

The furnace may be constructed with a lower roasting-hearth and an upper floor constructed to be used throughout a part of its extent as an ore-drying floor and throughout another part of its extent as an ore-cooling floor.

In the drawings, Figure 1 is a broken top plan view of a furnace of my improved construction involving a lower roasting-hearth and a cooling-floor running the full length, approximately, of the structure. Fig. 2 is a broken side elevation of the same; Fig. 3, an enlarged broken section taken on line 3 of Fig. 1 and viewed in the direction of the arrow; Fig. 4, a broken and partly-sectional side elevation of the left-hand end of the furnace shown in the previous figures and illustrating improved ore-elevating mechanism in the position for receiving ore from the lower hearth; Fig. 5, a view substantially the same as Fig. 4, but showing the elevating mechanism in the position of discharging ore onto the upper hearth or floor; Fig. 6, an enlarged broken section taken on line 6 of Fig. 1 and viewed in the direction of the arrow; Fig. 7, an enlarged broken elevation of a part of the left-hand end of the furnace shown in Fig. 1 and illustrating details of construction of the elevating mechanism; Fig. 8, a broken plan section taken on line 8 of Fig. 9 and illustrating details of the furnace structure; Fig. 9, an enlarged section taken on line 9 of Fig. 1, corresponding with line 9 of Fig. 11; Fig. 10, an enlarged broken section taken on line 10 of Fig. 9; Fig. 11, a broken plan view of a furnace of my improved construction in which the left-hand part of the upper floor constitutes a cooling-hearth and the right-hand part thereof a drying-hearth; Fig. 12, a broken side elevation of the construction shown in Fig. 11; Fig. 13, a broken top plan view of a furnace of my improved construction in which the entire upper floor constitutes a drying-hearth; Fig. 14, a broken side elevation of the construction shown in Fig. 13; Figs. 15, 16, 17, and 18, enlarged broken sections taken on lines 15, 16, 17, and 18 of Fig. 13 and viewed as indicated by the arrows; Fig. 19, a section taken on line 19 of Fig. 11, corresponding with line 19 of Fig. 13; Fig. 20, a broken cross-section of the lower or roasting hearth, illustrating a traveling stirring device of my improved construction; Fig. 21, a broken plan view of the traveling stirring device with only a part of the stirrer-blades or rabbles in place; Fig. 22, a cross-section of a stirring device, taken on line 22 of Fig. 24, showing in full lines one of a series of pivotal rabbles which operate upon the upper hearth and by dotted lines one of a series of stationary rabbles which operate upon the lower hearth, the former being in its lower position or the position to which it would drop when the carrier on which it is mounted moves to the upper hearth; Fig. 23, a section taken on line 23 of Fig. 24 and showing one of the pivotal rabbles in the same position as in Fig. 22; Fig. 24, a broken section taken on line 24 of Fig. 22 and viewed in the direction of the arrow; Figs. 25 and 26, details of construction of the mechanical stirring device; Fig. 27, a broken section of the mechanical stirring device, showing one of the rabbles which works upon the lower hearth; Fig. 28, a section of the mechanical stirring device showing a modification involving a pair of rabbles on a single pivotal support to work upon the upper and lower hearths; Fig. 29, an enlarged broken section taken on line 29 of Fig. 11, showing the end portion of the cooling-floor and the initial portion of the drying-floor; Fig. 30, a broken section of a stationary part of the furnace, taken on line 30 of Fig. 31 and showing improved clamps for holding a rail on which the traveling stirring devices travel along the upper hearth; Fig. 31, a broken section taken on line 31 of Fig. 30; Fig. 32, a broken view, partly in elevation and partly in section, illustrating a part of the furnace structure and means for tightening and loosening the tie-beams to compensate for contraction and expansion under variations of temperature; Fig. 33, a broken detail view of a movable chute and attendant parts in one position, and Fig. 34 a similar view of the same parts in another position.

The advantages of a furnace constructed with an upper and lower hearth are that facilities may be provided for roasting ore and drying it or cooling it, or both, in a comparatively small and compact space, which is a great advantage, especially in existing plants not intially designed for the use of mechanical roasting-furnaces and where on that account economy of space is necessary. Furthermore, as the ore must be advanced in one direction across the roasting-hearth and drying or cooling hearth, or both, fewer mechanical stirring devices and shorter cables may be employed than where the hearths are located upon the same level and in a straight line. In a furnace employing an upper and lower floor, one of which affords a roasting-hearth and the other a cooling or drying hearth, or both, there is a material advantage in locating the roasting-hearth below, for the reason that its bed is thoroughly inclosed and may be so insulated against radiation of heat that it possesses much greater heat-storage properties than can be rendered possible when it is located above.

In all the figures which show the furnace structure, A is the lower floor or roasting-hearth, and B the upper floor, whether employed for drying or cooling purposes. On opposite sides of the structure, toward one end, are fire-boxes C C, (see Fig. 17,) communicating with the roasting-chamber A'. Below the opposite end portion of the roasting-hearth is a pit or dust-chamber D, communicating with the roasting-chamber through passages $t\ t$, Fig. 18, and leading to a stack or chimney D'. In the drawings I show but two fire-boxes in which the roasting heat is generated, though only one or more than two may be employed without departing in any way from the invention. The roasting-hearth A is of suitable refractory material, resting upon a bed $A^2$ of heat-insulating material, which prevents loss of heat by radiation downward into the ground. Below opposite sides of the hearth A are longitudinally-extending foundations $A^3$, of masonry, in which are anchored coincident uprights or buckstaves E, which may be vertical I-beams, set at proper distances apart along opposite sides of the hearth. Companion buckstaves E on opposite sides are held together, as shown most clearly in Fig. 19, by means of tie-bars E'. On the upper ends of the buckstaves E (see Figs. 19 and 32) are bifurcated extensions $s$, and the tie-bars E', which are preferably in the form of I-beams, are provided at opposite ends with projecting screws $s'$, which pass between the bifurcated extensions and through blocks $s^2$ at the outer sides of the latter, the parts being held in place by means of nuts $s^3$, which bear against the outer surfaces of the blocks.

Resting upon opposite edges of the floor A at the buckstaves E are brackets or chairs F F', preferably set into the floor to render them stable and provided at their upper inner ends with shoulders $r$. The chairs F have extended inward-projecting bases $r'$, with flanges $r^2$ at their edges to receive the flange of a T-rail $q$. Near the brackets or chairs F' are rails $q'$, set upside down in the floor material, whereby the flange portion affords the tread. The rails $q\ q'$ extend approximately the full length of the hearth A. The chairs F F' form supports for continuous channel-iron pieces or skewbacks G, which fit behind the shoulders $r$ and rest against the buckstaves E.

$A^4$ is the roof or arch of the roasting-chamber and fits at opposite edges into the skewbacks G, by which it is supported. At opposite sides of the chamber A' are walls $A^5$, provided with horizontal longitudinally-extending slots $p$, the walls separating the roasting-chamber A' from lateral supplemental chambers $A^6$ $A^7$, in which the rails $q$ $q'$ are located. The lower parts $p'$ of the wall $A^5$ are comparatively short blocks of refractory material, such as fire-clay, set into recesses $p^2$ in the floor A and provided in their rear sides (see Fig. 20) with notches $p^3$. Thus the blocks $p'$ may be readily removed when desired by inserting a crowbar into the notches $p^3$ and lifting them out of the recesses $p^2$.

The spaces bounded by the buckstaves and edges of the floor and skewbacks are open and fitted with doors H. (See, for example, Fig. 8.) The doors H are metal plates which may be faced with asbestos or other non-refractory material and provided toward opposite edges with spring-latches H', which turn upon pivots $H^2$. The doors completely fill out the spaces between the buckstaves, resting at their edges against the chairs F or F', and at their upper and lower edges they overlap the skewbacks and edges of the floor A, as shown most plainly in Fig. 20. To fasten the doors, they are placed in position and the latches H' turned to press against the outer flanges of the I-beams, which form the buckstaves, the springy nature of the latches binding the doors firmly in place. To remove a door, it is merely necessary to turn its latches on their pivots and lift the door away from the opening. If desired, small peep-holes $H^3$ may be provided in the doors and covered with valves or provided with transparencies, such as mica.

On the tie-bars E' are rail-supporting chairs I I'. These chairs comprise companion clips $n$ $n$, formed as shown in Figs. 30 and 31, having sockets or recesses $n'$ $n'$ at their lower ends and rail-engaging recesses $n^2$ toward their upper ends. The clips fit flatwise together and are secured by a single bolt $n^3$. To place the chairs in position to support a rail, the clips or side pieces $n$ are placed upon the bar E' to embrace the upper flange of the latter and against opposite sides of the T-rail, and the bolt then passed through coincident openings in the sides or clips and fastened with the nut shown to hold the parts rigidly together. The only difference between the chairs I I' is that the chair I is constructed to engage the flange of a T-rail and the chair I' is constructed to engage the head of a rail placed upside down. The tie-bars E' serve to support the upper floor B, which may be of sheet or plate metal with lateral upward-extending flanges $m$.

At the opposite ends of the structure are wheels K, mounted upon shafts K'. The pair of wheels K at one end are the drive-wheels, their shaft being provided with a gear-wheel $K^3$, driven by a pinion $K^4$. Extending over the wheels, on each side, are endless cables $K^2$, which travel, respectively, in the chambers $A^6$ $A^7$ at the outer sides of the T-rails and along the upper side of the structure at the outer sides of the T-rails thereon, as indicated. The rails of the lower hearth curve upward at opposite ends of the structure in arcs of which the shafts K' are the centers, and the rails of the upper hearth curve downward at their ends within and concentric with the rails of the lower hearth.

L is a mechanical stirring device comprising a carriage formed with a cross-beam or rabble-carrying frame L' and end beams or trucks $L^2$, the latter being mounted upon wheels. The wheels $L^3$ on one of the trucks are grooved, as shown, for example, to the left in Fig. 21, while the wheels $L^4$ on the other truck are flat. The wheels $L^3$ travel upon the rails $q$ and the wheels $L^4$ on the rails $q'$. The engagement of the grooved wheels $L^3$ with the rails $q$ hold the carrier against lateral play, while the flat wheels upon the rails $q'$ offer no obstruction to the expansion and contraction of the carrier. The cross-beam L' is in the form of an I-beam with forward flanges $l$ and rear flanges $l'$.

Owing to the tendency of ores under heat to become somewhat pasty, causing accretions to form on the hearth, I have found it desirable to employ shoes or rabble-points of special construction which in operation tend to cut down the accretions, and thus keep the floor of the furnace always down to about the same plane. It has been usual hitherto to employ rabble-points in the form of flat-sided blades, all upon one carrier being set at one angle and all upon the next carrier being set at an opposite angle, whereby the rabbles on one carriage would move the ore diagonally toward one side and the rabbles upon the next carriage would move the ore diagonally toward the opposite side. Rabbles so constructed have been found objectionable for several reasons, one of which is that ever so slight a variation in their angles upon the carriages would cause the ore to creep gradually to one side of the hearth, necessitating frequent adjustment. In practice the rabble-points are subjected to but little wear except by attrition of the ore passing under them. This attrition tends to cause the forward corner or point of a rabble to wear rounding, and when once the square sharp lower corner is rounded it wears rapidly and as it wears the natural accretion of the ore upon the hearth begins to form ridges that in time grow to proportions great enough to necessitate barring out of the furnace. In my present construction of rabble-points I overcome all these difficulties.

M M are the intermediate shoes or rabble-points, which are intended to work upon the lower or roasting hearth. M' M' are the outer shoes or rabble-points, which work upon the lower hearth, and $M^2$ $M^2$ the rabble-points which work upon the upper hearth. The lower and upper rabble-points may be separately mounted upon the carrier-beam L, as shown by Figs. 20 to 27, inclusive, or they may have common supporting means, as shown in Fig. 28.

Referring first to the constructions shown in Figs. 20 to 27, inclusive, each shoe M is rigidly secured to an arm or bar $k$, bent as shown in Fig. 27, and provided toward its upper forward end with teeth $k'$. The rabble is secured to the carrier-beam L' by means of a clip $M^3$, formed of separable upper and lower halves, which dovetail together, as indicated in Fig. 25. The clip $M^3$ is provided on its rear side with upper and lower claws $i$ to engage the flange $l$ of the carrier-beam L' and a central vertical slot extending from the back nearly to the front to receive the arm $k$. At the forward upper end of this vertical slot is a tooth or shoulder $i'$, which fits and engages any one of the serrations $k'$. The arm $k$ may be set to any elevation in the clip $M^3$ and fastened in place by means of a key $i^2$, driven between it and the beam L'. When it is desired to lower the rabble from the position shown in Fig. 27, the key $i^2$ is withdrawn and the bar $k$ lowered one or more notches, when the key is driven into place to tighten the parts rigidly together. The rabble-points M', which are only provided upon, say, every second or third carrier of the series employed, are straight blades or one-half the width of the points M, being mounted in the same way as the latter points. The points M and $M^2$ have faces $h\,h$ at an acute angle with each other and lower edge or wearing faces $h'$. In the movement of the carrier across the hearth the edges $h'$ of the shoes slide upon or close to the hearth, and the ore is plowed by the points into furrows and advanced. The shoes or rabble-points M' are mounted upon bars $g$, pivotally secured toward their ends to blocks $g'$. The clips $M^3$, which secure the points M' to the beam L', are formed with side plates $i^3$ and upper and lower cross-bars $i^4$. (See Fig. 25.) On the inner faces of the side plates $i^3$ are vertical ribs or shoulders $i^5$, which may be half-dovetailed, as indicated in Fig. 24. The blocks $g'$ have vertical shoulders $g^2$ to fit behind the shoulders $i^5$, and the parts are secured together by means of a key $i^2$, driven between the beam L' and block $g'$. The block may be raised and lowered in the clip and fastened in adjusted position by means of the key. On the arm $g$ are two bearing-surfaces $g^3$ and $g^4$. (See Fig. 23.) As the carrier upsets in its movement to the upper hearth the weight of the rabble M' causes it to drop to the position shown in Fig. 23, wherein the surface $g^3$ of the arm $g$ bears against the block or head $g'$ and causes the lower edge $h'$ of the rabble-point to extend parallel with the floor of the upper hearth. When the carrier upsets in its movement from the upper to the lower hearth, the weight of the rabble $M^2$ swings the arm $g$ on its pivot until the surface $g^4$ strikes the surface of the head $g'$, causing the rabble $M^2$ to extend in the horizontal plane, as indicated most plainly in Fig. 20. Thus while the rabbles $M^2$ will drop to the surface of the upper hearth when moved thereto they will move to the horizontal position as they reach the lower hearth and extend no higher approximately than the upper surface of the beam L'. Thus the roof or arch $A^4$ of the roasting-hearth need be no higher from the floor than would be necessary were the lower-hearth rabbles alone employed, which is a very desirable advantage. The shoes or rabble-points M M' $M^2$ as they wear off at their lower surfaces $h'$ may be lowered, as described, and when worn out at that end may be reversed by knocking out the pins or keys $k^3$, by which they are secured to their supporting-arms, turning them upside down and fastening them, as before.

In the construction shown in Fig. 28 lower and upper hearth shoes M $M^2$, which are not adapted to be reversed upon their supports, are fastened to a bent arm $f$, hinged at the center upon a pin $f'$ in a head or block $g'$, secured to the beam L' in the same way as the other head $g'$ described. The arm or bar $f$ has bearing-surfaces $f^2 f^3$. Each shoe or point is provided with a tooth $i'$, adapted to engage notches $k'$ in the arm, and the pins or keys which fasten the shoes to the arm pass through elongated slots $f^4$ in the arm. The shoes may be adjusted by knocking out the keys $k^3$ and moving them at their teeth $i'$ into engagement with another notch $k'$ and then driving the key $k^3$ back into place. While the carrier is moving across the lower hearth, the arm $f$ drops to the position where its edge $f^2$ bears against the adjacent surface of the head. When the carrier moves to the upper hearth, the arm drops to bear at its surface $f^3$ against the surface of the head.

Pivotally connected to the centers of the trucks $L^2$ are arms $L^5$, which extend parallel with the trucks and are pivotally connected at their opposite ends to blocks $K^3$, which are rigidly secured to the cables $K^2$. The cables as they travel their endless course move the mechanical stirring devices along the upper and lower hearths. The rabbles move in the furnace-chamber and the trucks in the lateral chambers $A^6\,A^7$, the beam L', toward opposite ends, moving in the slot $p$ of the wall $A^5$. Thus the trucks, cable, and attendant parts are shielded from the direct action of the heat in the roasting-chamber, while the doors H prevent the outside atmosphere from rushing into the chambers $A^6\,A^7$ and through the slot into the roasting-chamber. While the mechanical stirring devices are moving along the lower hearth, the rabbles M M' stir and advance the ore thereon. After passing the end of the roasting-hearth the rabbles move up the circular end portions of the lower tracks onto the upper tracks to the upper hearth, the pivotally-mounted rabbles $M^2$ falling into position to work along the upper hearth and stir and advance the ore thereon. Every second or third carrier should be provided with end rabbles, like the rabbles M', but pivotally mounted, like the rabbles M², whereby they will work upon the upper hearth and extend horizontally while passing along the lower hearth. At opposite end portions of the roasting-chamber are hinged doors N N', respectively, which open for the passage of the mechanical stirring devices and close after them.

In the construction shown in Figs. 1 and 2 the upper floor is intended to afford a cooling-hearth upon which the ore, after it has been roasted in the roasting-chamber, is deposited and across which it is advanced by the mechanical stirring devices. The upper floor B rests upon the cross-beams E', as before described, and to prevent radiation of heat from the roasting-chamber to the floor I prefer to cover the roof or arch $A^4$ with a sheathing P of refractory material, such as mineral wool or asbestos. Above the sheathing P is a dead-air space P', and above the said air-space a wall $P^2$, which may be sheet metal lined with mineral wool or the like. The refractory material and dead-air space $P^2$ effectively preclude radiation of heat from the roasting-chamber to the cooling-floor. While the drawings show the cooling-floor very close to the roof of the roasting-chamber, this construction may be changed as desired to increase the distance between them and permit of a more extensive dead-air space, if desired.

The means for elevating the ore from the roasting-hearth to the cooling-floor will be next described. On the shaft K', at opposite sides of the furnace-wall, are loose collars R, each provided with a fixed pulley R' and arms $R^2 R^3$. Fulcrumed at $e$ on each side of the furnace is a lever $R^4$, which extends up the side of the furnace and over the top of the latter into the path of the mechanical stirring devices. From each lever extends a cable, chain, or the like $e'$ over the adjacent pulley R', and at its end it carries a weight $e^2$, which tends normally to hold the levers in the position shown in Fig. 4. Pivotally mounted between the free ends of the arms $R^2$ is a trough or receptacle $R^5$ of a length approximating at least the width of the roasting-hearth. On the arms $R^3$ are adjustable counterweights $R^6$. At each end of the trough is a projecting finger $e^3$, and on opposite sides of the upper rails are stops $e^4$. At the end of the roasting-hearth floor is an inclined chute $e^5$, beneath which the trough $R^5$ normally extends. In operation as a traveling stirring device moves to the end of the roasting-hearth it advances a certain quantity of the ore that has been roasted to the chute $e^5$, whence it falls into the trough $R^5$. When the traveling stirring device moves onto the upper floor, its trucks strike the upper ends of the levers $R^4$ and turn the levers on the pivots $e$ from the position shown in Fig. 4 to the position shown in Fig. 5. As the levers turn they draw the cables $e'$ and turn the pulleys R', causing the arms $R^2$ to be swung upward to the position shown in Fig. 5. The fingers $e^3$ on the troughs strike the chute W, hereinafter described, and stops $e^4$, causing the troughs to be upset and deposit the ore upon the upper hearth. When the trucks have moved past the levers $R^4$, the latter are released and returned by the weights $e^2$ to their initial positions, causing the arms $R^2$ and trough $R^5$ to return to the position shown in Fig. 4. The weights $R^6$ tend to counterbalance the trough to aid in elevating the ore and counterbalance the trough in its return to the initial position to prevent too great a jar in its descent. Buffers may be provided at the lower side of the end of the furnace to take the impact of the trough when it descends. The parts are so adjusted with relation to each other that the ore elevated by the trough is deposited upon the upper hearth just in rear of the rabbles of the mechanical stirring device which has brought about the elevation of the ore.

To prevent the raising of dust as the ore is dumped from the trough or receptacle $R^5$ onto the cooling-floor, I provide a plate or chute W, (see Figs. 33 and 34,) which extends across the cooling-floor and is mounted upon arms W', pivoted at $w$, and provided below the pivots with weights $w'$, which tend to cause the chute to extend horizontally above the path of the mechanical stirring devices. On the arms $R^2$ are cams $w^2$, which, as the trough is raised, strike the chute W and move it to the inclined position shown in Fig. 34 to receive the ore dumped from the trough. As the trough returns to the lower hearth the cam $w^2$ releases the chute, whereby it is moved by the weights $w'$ to the position shown in Fig. 33, sliding in its movement from beneath the ore that has been dumped thereon.

While I prefer to construct the elevating mechanism as shown and described, it may of course be variously modified.

When the entire upper floor is to be employed for cooling purposes and the ore is initially fed to the end of the roasting-hearth, I prefer to provide the ore-feeder shown most clearly in Fig. 3. It comprises a frame S, mounted upon wheels and movable by means of a screw S' or other suitable mechanism toward and away from the end of the furnace. On the frame is a hopper $S^2$, from which extends a trough $S^3$ to the hearth. By means of the screw the trough may be adjusted more or less into the path of the rabbles. Ore fed into the hopper $S^2$ moves down the chute $S^3$ and spreads itself upon the end of the hearth. The hopper may be provided with suitable ore-gates $S^4$ for regulating in some degree the flow of ore from the hopper. The hopper-frame is so set with relation to the hearth and rabbles that as the ore flows from the hopper it impinges upon the hearth and continues flowing until it piles up and comes to an angle of rest in such relation to the rabbles that as they descend from the upper hearth the rabbling-points cut into the body of the ore and rake a portion forward. The ore again flows, filling the space cleaned by the rabbles until the ore is again at rest. To increase the feed to the furnace, it is only necessary to move the hopper-frame forward, so that the face of the ore when at rest comes closer to the rabbling carriage or beam L', which causes the rabbling-points to cut deeper into the ore and remove an increased quantity. To decrease the feed, the hopper-frame is moved in the backward direction, whereby the quantity of ore removed by the rabbles will be lessened in each operation. Thus any variation of feed desired may be obtained.

Any desired number of mechanical stirring devices may be employed. In operation the products of combustion from the fire-chambers pass along the roasting-hearth to the dust-chamber D, whence they escape to the stack D'. The ore taken by the rabbles from the pile at the base of the chute S³ is advanced intermittingly by successive stirring devices through the door N and along the roasting-floor, each successive stirring device operating to plow the ore to expose it thoroughly to the action of the heat and advance it intermittingly against the current from the fire-boxes until, after being thoroughly roasted, it passes through the door N' to the elevating mechanism and is deposited thereby upon the cooling-floor. The stirring devices plow and advance the ore in the same way along the cooling-hearth until it is thoroughly cooled. In the position shown on the upper hearth is a crosswise-extending trough T, containing a screw conveyer T'. As the cooled ore is deposited by the rabbles in the trough T it is conveyed to one side and discharged by means of the screw T'.

Usually ores that require cooling after roasting are crushed dry and do not require preparatory drying before being fed to the roasting-chamber. My improved furnace employing a cooling-floor the full length of the structure is adapted more especially for handling such ore. In many cases the ore to be roasted consists of concentrates that carry from ten to thirty per cent. of moisture. Were such ores discharged directly onto the roasting-hearth great loss of heat would ensue, owing to the excessive moisture, which would retard the roasting of the ore to a very material and detrimental extent. For such ores, which require preliminary drying and final cooling, I prefer to employ the structure shown in Figs. 11 and 12. In this construction the cooling-hearth extends from the left-hand end of the furnace to the discharge-trough T, located, say, at about midway between the ends of the upper floor. The drying-floor extends from the trough T to the right-hand end portion of the furnace, where it terminates in a chute U, leading to the lower hearth just beyond the outlets t for products of combustion. Beneath the drying-hearth are end walls V and side walls V', extending upward from the arch A⁴ and forming an inclosed chamber V² beneath the floor B. The arch is provided with perforations V³, leading from the roasting-chamber to the chamber V², so that hot products of combustion will circulate in the chamber V² and keep the drying-floor hot. The wet ore may be fed from the hopper V⁴ or any suitable feeding means located at the initial end of the drying-floor, the mechanical stirring devices operating to plow and advance the ore along the drying-floor, so that it may be more or less thoroughly freed from moisture before it is discharged through the chute U onto the roasting-hearth. The ore is plowed and advanced along the roasting-hearth to the left-hand end of the furnace, whence it is raised by the elevator to the cooling-floor and plowed and advanced to the trough T and discharged by means of the screw or other conveyer T'.

The structure shown in Figs. 13 and 14, which shows a drying-hearth running the full length of the upper floor, would be employed in treating ores which carry moisture and require preliminary drying, but which for their after treatment do not require to be cooled. In this construction the cooling-floor is dispensed with and the space beneath the entire upper floor is inclosed by means of transverse walls V and longitudinally-extending walls V', the space V² communicating with the roasting-chamber through openings V³ in the arch A⁴. In this construction the preliminary feeder V⁴ is at the left-hand end of the upper floor and the discharge-trough T and conveyer T' are located at the left-hand end of the roasting-hearth.

While I make no claim, broadly, to a drying-hearth located above the roasting-chamber, the hearth constructed as described, with a heating-chamber beneath it communicating with the roasting-chamber, is believed to be new and is a very desirable construction. So far as I am aware no furnace has hitherto been constructed with a cooling-floor above the roasting-chamber, and I believe this to be broadly new, whether the cooling-hearth extends the entire length of the upper floor or only part of the length of the latter.

It is to be understood that while I prefer to employ the details throughout as shown and described they may be variously modified without departing from the spirit of my invention as defined by the claims.

What I claim as new, and desire to secure by Letters Patent, is—

1. In an ore-roasting furnace, the combination of a roasting-hearth, a cooling-floor above the roasting-hearth, mechanical stirring devices mounted to travel along the said hearth and floor to stir and advance the ore, and elevating means operating to raise the ore discharged from the roasting-hearth and deposit it upon the cooling-floor, substantially as described.

2. In an ore-roasting furnace, the combination of a roasting-hearth, a cooling-hearth above the roasting-hearth, heat-insulating means between the roof of the roasting-hearth and the floor of the cooling-hearth, mechanical stirring devices mounted to travel along the upper and lower hearths to stir and advance the ore, and elevating means operating to raise the ore discharged from the roasting-hearth and deposit it upon the cooling-hearth, substantially as described.

3. In an ore-roasting furnace, the combination of a roasting-hearth, a floor above the roasting-hearth forming throughout part of its extent a cooling-hearth, and forming throughout another part of its extent a drying-hearth, ore-feeding means at one end of the drying-hearth, ore-discharging means at the opposite end of the drying-hearth communicating with one end portion of the roasting-hearth, mechanical stirring devices mounted to travel along the hearths to stir and advance the ore, elevating means at the discharge end of the roasting-hearth operating to raise the ore and deposit it upon one end portion of the cooling-hearth, and discharging means for the ore at the opposite end portion of the cooling-hearth, substantially as described.

4. In an ore-roasting furnace, the combination of a roasting-chamber, a drying-hearth above the roasting-chamber, heating means for the drying-hearth comprising an inclosed chamber communicating with the roasting-chamber to be heated therefrom and extending longitudinally between the roof of the roasting-chamber and the floor of the drying-hearth, mechanical stirring devices movable along the hearth of the roasting-chamber and along the drying-hearth, and means for discharging the ore from the drying-hearth into the roasting-chamber, substantially as described.

5. In an ore-roasting furnace, the combination of a roasting-hearth, a cooling-hearth above the roasting-hearth, mechanical stirring devices, movable along the roasting-hearth, and thence upward to and along the cooling-hearth, and ore-elevating means at the end of the roasting-hearth actuated by the movement of the mechanical stirring devices to raise the ore discharged from the roasting-hearth and deposit it upon the cooling-hearth, substantially as described.

6. In an ore-roasting furnace, the combination of a roasting-chamber provided with a roof, a cooling-floor above the said roof, a dead-air space between said roof and cooling-floor, mechanical stirring devices, movable along the hearth of the roasting-chamber and along the cooling-floor, and elevating means operating to raise the ore discharged from the roasting-chamber and deposit it upon the cooling-floor, substantially as described.

7. In an ore-roasting furnace, the combination of a roasting-chamber provided with a roof, a cooling-floor above the roasting-chamber, a layer of heat-insulating material on the roof, a dead-air space above said layer, a layer of heat-insulating material between said dead-air space and cooling-floor, mechanical stirring devices mounted to travel along the floor of the roasting-chamber and along the cooling-floor to stir and advance the ore, and elevating means operating to raise the ore discharged from the roasting-chamber and deposit it upon the cooling-floor, substantially as described.

8. In an ore-roasting furnace, the combination of a roasting-hearth, a cooling-floor above the roasting-hearth, mechanical stirring devices mounted to travel along the roasting-hearth and the cooling-floor to stir and advance the ore, elevating means operating to raise the ore discharged from the roasting-hearth and deposit it upon the cooling-hearth, an ore-receiving chute upon the cooling-floor, and means for moving the chute from its ore-receiving position to extend out of the path of the mechanical stirring devices as they pass, substantially as and for the purpose set forth.

9. In an ore-roasting furnace, the combination of a roasting-hearth, a cooling-floor above the roasting-hearth, mechanical stirring devices, mounted to travel along the roasting-hearth and along the cooling-floor, ore-elevating means, movable from the roasting-hearth to the cooling-floor and operating to raise the ore discharged from the roasting-hearth and deposit it upon the cooling-floor, and an ore-receiving chute normally above the cooling-floor, out of the path of the mechanical stirring devices, and in the path of the ore-elevating means, to be moved thereby to the cooling-floor to receive the ore discharged by the elevator, substantially as and for the purpose set forth.

10. In an ore-roasting furnace, the combination of a roasting-hearth, a cooling-floor above the roasting-hearth, mechanical stirring devices, mounted to travel along the roasting-hearth and along the cooling-floor, and means for raising the ore discharged from the roasting-hearth and depositing it upon the cooling-floor, comprising a pivotal support, a receptacle on the support and means for swinging the support on its pivot to move the receptacle back and forth between the roasting-hearth and cooling-floor, substantially as and for the purpose set forth.

11. In an ore-roasting furnace, the combination of a roasting-hearth, a cooling-floor above the roasting-hearth, a mechanical stirring device, movable along the roasting-hearth and along the cooling-floor, and means for raising the ore discharged from the roasting-hearth and depositing it upon the cooling-floor, comprising a pivotal support, a receptacle on the support, lever mechanism in the path of the stirring device connected with the pivotal support and operating when engaged by a stirring device to turn the support on its pivot and move the receptacle from its ore-receiving to its ore-discharging position, substantially as and for the purpose set forth.

12. In an ore-roasting furnace, the combination of a roasting-hearth, a cooling-floor above the roasting-hearth, a mechanical stirring device, movable along the roasting-hearth and along the cooling-floor, and means for raising the ore discharged from the roasting-hearth and depositing it upon the cooling-floor, comprising pivotal supporting-arms, a receptacle pivotally mounted between said arms and extending normally below the end of the roasting-hearth, pulleys connected with the supporting-arms, pivotal levers extending normally into the path of the mechanical stirring device, cables or the like, extending from the levers over the pulleys and operating when the levers are engaged and moved by a mechanical stirring device to rotate the pulleys and swing the supporting-arms upward to raise the receptacle to the cooling-floor, and means for upsetting the receptacle when it arrives at the cooling-floor, substantially as and for the purpose set forth.

13. In an ore-roasting furnace, the combination of a roasting-hearth, a mechanical stirring device provided with rabbles and mounted to travel in one direction along the roasting-hearth and return in a plane above the roasting-chamber, and an ore-feeder at the end portion of the roasting-hearth comprising a chute extending over the hearth whereby ore fed thereto moves down the chute and is deposited upon the hearth, and means for moving the chute toward and away from the path of the rabbles, substantially as and for the purpose set forth.

14. In an ore-roasting furnace, the combination of a roasting-hearth, a mechanical stirring device provided with rabbles and mounted to travel in one direction along the roasting-hearth and return in a plane above the roasting-chamber, and an ore-feeding device comprising a frame, a receptacle on the frame, a chute extending from the receptacle over the hearth and means for moving the frame to adjust the chute with relation to the path of the rabbles, substantially as and for the purpose set forth.

15. A mechanical stirring device for ore-roasting furnaces, comprising a carrier and means for moving it along the roasting-hearth, and reversible rabbles removably mounted upon the carrier and each comprising a body having the faces $h\ h$ extending at acute angles from their junction, and beveled at its opposite ends to produce the working faces $h'\ h'$, substantially as and for the purpose set forth.

16. A mechanical stirring device for ore-roasting furnaces, comprising a carrier-beam having a flange, means for moving the carrier-beam along the hearth, rabbles, supporting-arms for the rabbles, and means for securing the supports to the carrier-beam, comprising separably-intermeshing clips engaging the flange of the beam and to which the said supports are keyed, substantially as described.

17. In an ore-roasting furnace having upper and lower floors, the combination of a rabble-carrying frame, means for moving the frame along both floors and rabbles loosely secured to the frame in position to work upon one said floor and drop away from their said working position on the carrying-frame when moved to the other floor, substantially as and for the purpose set forth.

18. In an ore-roasting furnace having upper and lower floors, a rabble-carrying frame and means for moving it along both said floors and for upsetting it as it moves from one floor to the other, and rabbles loosely mounted upon the frame to drop into working position as they move to one floor, and drop away from said working position upon the frame when moved to the other floor, substantially as and for the purpose set forth.

19. In an ore-roasting furnace having upper and lower floors, the combination of a rabble-carrying frame and means for moving it along both floors and for upsetting it as it moves from one floor to the other, and rabbles pivotally mounted upon the frame to swing into working position when moved to one floor and swing out of said working position upon the frame when moved to the other floor, substantially as and for the purpose set forth.

20. In an ore-roasting furnace having a roasting-hearth and a floor above the roasting-chamber, the combination of a mechanical stirring device, having a rabble-carrying frame, means for moving the stirring device along the roasting-hearth and upper floor and for upsetting the frame as it moves from one floor to the other, rabbles mounted upon the frame to work upon the roasting-hearth, and rabbles loosely mounted upon the frame to extend and work upon the upper floor, and drop to a retracted position when the frame is upset to move along the roasting-hearth, substantially as and for the purpose set forth.

21. In an ore-roasting furnace, the combination of a roasting-hearth, series of vertically-disposed buckstaves along opposite sides of the hearth, chairs resting upon the hearth at the buckstaves, skewbacks resting upon the chairs and supporting the arch of the roasting-chamber, tie-bars connecting the buckstaves, rail-holding clips upon the tie-bars, and rails supported by the clips, substantially as described.

HORACE F. BROWN.

In presence of—
  J. H. LEE,
  E. B. KIRBY.